US005249000A

United States Patent [19]

Okabe et al.

[11] Patent Number: 5,249,000

[45] Date of Patent: Sep. 28, 1993

[54] THERMOREVERSIBLE RECORDING MEDIUM, APPARATUS UTILIZING THE SAME AND METHOD FOR FABRICATING THE SAME

[75] Inventors: Yutaka Okabe; Yoichi Nishioka; Hiroyo Kato, all of Tokyo, Japan

[73] Assignee: Oki Electric Industry Co., Ltd., Tokyo, Japan

[21] Appl. No.: 866,872

[22] Filed: Apr. 10, 1992

Related U.S. Application Data

[62] Division of Ser. No. 613,128, Nov. 15, 1990.

[30] Foreign Application Priority Data

| | | | |
|---|---|---|---|
| Nov. 17, 1989 | [JP] | Japan | 1-297445 |
| Nov. 28, 1989 | [JP] | Japan | 1-308323 |
| Nov. 28, 1989 | [JP] | Japan | 1-308324 |
| Dec. 28, 1989 | [JP] | Japan | 1-344064 |

[51] Int. Cl.[5] ........ G11B 3/00; G01D 15/06; G01D 9/00

[52] U.S. Cl. ........ 346/151; 346/153.1; 346/135.1; 428/913

[58] Field of Search ........ 346/151, 153.1, 135.1

[56] References Cited

U.S. PATENT DOCUMENTS

| | | | |
|---|---|---|---|
| 4,268,413 | 5/1981 | Dabisch . | |
| 4,318,937 | 3/1982 | Ceintrey . | |
| 4,330,785 | 5/1982 | Yabuta et al. | 346/135.1 X |
| 4,442,429 | 4/1984 | Kotani et al. . | |
| 4,695,528 | 9/1987 | Dabisch et al. . | |
| 4,783,376 | 11/1988 | Sakaki et al. | 346/135.1 X |
| 4,884,082 | 11/1989 | Sonoda et al. | 346/107 R X |
| 4,917,948 | 4/1990 | Hotta | 346/135.1 X |
| 4,977,030 | 12/1990 | Hotta et al. | 346/135.1 X |

FOREIGN PATENT DOCUMENTS

| | | |
|---|---|---|
| 0322903 | 7/1989 | European Pat. Off. . |
| 225796 | 11/1985 | Japan . |

*Primary Examiner*—George H. Miller, Jr.
*Attorney, Agent, or Firm*—Spencer, Frank & Schneider

[57] ABSTRACT

An image forming apparatus which permits reversible recording and erasure by a heating means, and permits storage, display, printing or reproduction of an image or other information. The present apparatus thermoreversibly records an image on a matrix material of a copolymer of styrene and butadiene and a low molecular weight, saturated carboxylic acid, preferably containing from 10 to 24 carbon atoms, and where the weight ratio of the matrix material to carboxylic acid is from 1:1 to 20:1.

8 Claims, 10 Drawing Sheets

THERMOREVERSIBLE RECORDING MEDIUM, APPARATUS UTILIZING THE SAME AND METHOD FOR FABRICATING THE SAME

This is a division of Ser. No. 07/613,128 filed Nov. 15, 1990, now allowed.

FIELD OF THE INVENTION

This invention relates to a thermoreversible recording medium which permits reversible recording and erasure to be repeated by use of a heating means, such as a thermal head or a laser. Such a recording medium is used, for example, for storage, display or printing of image or other information.

This invention also relates to a method of fabricating a thermoreversible recording medium and image forming apparatus utilizing the thermoreversible recording medium.

BACKGROUND OF THE INVENTION

A reversible thermosensitive or thermoreversible recording medium has the property that its transmittance (here and in the following discussion we are referring to transmittance with respect to visible light) varies according to its thermal history. That is, it has hysteresis characteristics in the relation between the transmittance and the temperature. It is therefore possible to create a difference of transmittance between a given part of the medium and another part, and therefore to record image or any other information on the medium, by giving a different thermal history to these parts by use of a thermal head, a modulated laser beam, or like selective heating means.

Examples of the structure of the thermoreversible recording medium are disclosed, for example, in Japanese Patent Kokai Publication No. 55-154198.

The thermoreversible recording medium disclosed in this publication comprises a matrix of a polymer such as a polyester or resin, in which an organic substance of low molecular weight such as behenic acid is dispersed.

FIG. 1 shows the hysteresis curve of variation of transmittance with temperature of this conventional thermoreversible recording medium, with transmittance on the vertical axis and temperature on the horizontal axis. We shall now describe the properties of this conventional thermoreversible recording medium with reference to FIG. 1.

Firstly, in the region of room temperature (RT), this conventional thermoreversible recording medium exhibits either transmittance (A) (opaque state) or transmittance (D) (transparent state) as shown in FIG. 1 depending on its thermal history.

If the thermoreversible recording medium is heated above a temperature $T_0$ to a temperature $T_1$, its transmittance (A) or (D) changes to (B). Subsequently, when the thermoreversible recording medium is cooled to room temperature, its transmittance (B) changes to (D), and the thermoreversible recording medium then retains a transparent state (D).

Conversely, if a thermoreversible recording medium whose transmittance was (A) or (D) in the region of room temperature is heated above $T_0$ and $T_1$ so as to reach or exceed a temperature $T_2$, its transmittance (A) or (D) changes to (B) and then (C), that is, its transmittance decreases slightly in comparison to the transparent state (D). Subsequently, when the medium is cooled to room temperature, its transmittance changes from (C) to (A), and it then retains an opaque state (A).

The following specific examples of the above properties are disclosed in the Japanese Patent Kokai Publication No. 55-154198.

(1) A thermoreversible recording medium comprising a high molecular weight normal-chain copolyester whose principal components are an aromatic dicarboxylic acid and an aliphatic diol together with docosanic acid exhibited stable transparency when it was heated to 72° C. and then cooled. The opaque state of the medium was restored only when it was re-heated to a temperature above 77° C.

(2) A thermoreversible recording medium comprising a copolymer of vinylidene chloride and acrylonitrile together with docosanic acid and a fluoride lubricant to improve fluidity exhibited stable transparent state when it was heated to 63° C. and then cooled. The opaque state of the medium was restored only when it was re-heated to a temperature above 74° C.

(3) A thermoreversible recording medium comprising a copolymer of vinyl chloride and vinyl acetate together with docosanol exhibited stable transparency when it was heated to 68° C. and then cooled. The opaque state of the medium was restored only when it was re-heated to a temperature above 70° C.

(4) A thermoreversible recording medium comprising a polyester and docosanic acid exhibited stable transparency when it was heated to 72° C. and then cooled. The opaque state of the medium was restored only when it was re-heated to a temperature above 77° C.

However, the range of temperature in which the thermoreversible recording medium in the prior art will be in the transparent state, which is required in applications to display or image forming apparatus is $(77-72)=5$° C. in the case of the type (1), 11° C. in the case of type (2), 2° C. in the case of type (3), or 5° C. in the case of type (4), and thus it is not more than about 11° C. In a display in which the character portions are transparent (such makes it easier to view), the temperature control of the thermal head or other thermal means is difficult because the range of temperature in which the thermoreversible recording medium is made transparent is narrow. It is therefore difficult to obtain the transparent state stably when the image is repeatedly formed.

Moreover, with the thermoreversible recording medium of the prior art, the contrast between the transparent state and the opaque state was not large enough and improvement has been desired.

Further, Japanese Patent Kokai Publication No. 57-82088 discloses:

(a) a thermoreversible optical recording medium having a similar composition to the above media, and containing also carbon black which absorbs laser light to generate heat, and:

(b) a thermoreversible optical recording medium comprising a heat generating layer containing carbon black which absorbs laser light to generate heat, and a recording layer having a similar composition to the above recording materials deposited on said heat generating layer.

The above publication also gives two recording methods using this thermoreversible optical recording medium, namely opaque recording and transparent recording. We shall here briefly describe these recording methods with reference to FIG. 1, FIG. 2A, and FIG. 2B. FIG. 2A is a drawing for the purpose of explaining the opaque recording method, and FIG. 2B a drawing for the purpose of explaining the transparent method. Both drawings show partial plan views and sections of the thermoreversible optical recording medium.

(a) Firstly, the opaque recording procedure begins with the recording layer in a completely transparent state. If the layer is not transparent, it is made transparent by heating to a temperature between $T_1$ and $T_2$ in FIG. 1, and then cooling to room temperature. Subsequently, as shown in FIG. 2A, areas 13a (only one of them being shown) of heat generating layer 13 corresponding to areas 11a of recording layer 11 at which it is desired to write or record, are irradiated by a small spot laser such that the temperature of written areas 11a rises above $T_2$ in FIG. 1. This causes only written areas 11a to become opaque, and recording takes place. To erase this recording, areas 13a of the heat generating layer corresponding to said opaque areas are irradiated by a laser with a larger spot and lower energy than that used to form the opaque areas. This irradiation causes the temperature of the opaque areas of recording layer 11 to rise to between $T_1$ and $T_2$ in FIG. 1, and the opaque areas therefore return to the transparent state.

The reason why the laser spot used for erasure is larger than that used for recording is that it is difficult to re-irradiate only the opaque areas with the laser beam.

(b) Conversely, in the transparent recording method, the recording layer is initially in an opaque state throughout its surface. If the layer is not opaque, it is made opaque by heating to a temperature above $T_2$ in FIG. 1, and then cooling to room temperature. Subsequently, areas 13a (only one of them being shown) of heat generating layer 13 corresponding to areas 11a of recording layer 11, are irradiated by a small spot laser such that the temperature of areas 11a rises to between $T_1$ and $T_2$ in FIG. 2. This causes only written areas 11a to become transparent, and recording takes place. To erase this recording, the areas of the heat generating layer corresponding to said transparent areas of the recording layer are irradiated by a laser with a larger spot and higher energy than that used to form the transparent area. This irradiation causes the temperature of the transparent areas to rise above $T_2$ in FIG. 1, and the transparent areas therefore return to the opaque state.

The thermoreversible optical recording medium of the prior art became opaque when it was heated to a temperature above $T_2$ and cooled to room temperature, and became transparent when it was heated to a temperature between $T_1$ and $T_2$, and cooled to room temperature. The following problems were therefore inherent in the opaque recording method and transparent recording method, respectively.

(a) In the opaque recording method, when the opaque area (recording area) was made transparent, it was very difficult to re-irradiate only the opaque area with the laser, and so a larger area which included the opaque area had to be irradiated by a laser with a larger spot. However, as the area surrounding the opaque area was transparent, the transparent area passed more light, the corresponding part of the heat generating layer easily generates heat, and its temperature rose higher than that of the part corresponding to the opaque area. As a result, if the laser irradiation conditions were adjusted so that the temperature of the opaque area of the recording layer was between $T_1$ and $T_2$, the temperature of the surrounding area rose above $T_2$. While the opaque area could therefore be returned to the transparent state, the surrounding area became opaque. If on the other hand the laser irradiation conditions were adjusted so that the temperature of the surrounding area did not reach $T_2$, the temperature of the opaque area did not reach $T_1$ and the opaque area could not be returned to the transparent state. In either case, therefore, it was impossible to erase the recording completely.

(b) In the transparent recording method, higher recording densities are achieved if the laser spot which is used for recording is smaller. However, to form a transparent area with such a small spot, the temperature of an extremely minute area of the thermosensitive layer has to adjusted to within a very narrow range $T_1$–$T_2$ which is only of the order of 2°–10° C. or so. Such fine temperature control is very difficult to perform.

Further, an example of the thermoreversible display medium comprising a recording layer of the above recording materials on a colored support member, is disclosed for example in Japanese Patent Kokai Publication No. 62-257883., In the thermoreversible display medium of this publication, the colored support is black or red with a surface smoothness of no less than 300 sec. Further, the recording layer of this thermoreversible display medium exhibits the same temperature-transmittance variation properties as those of FIG. 1, and image recording and erasure can therefore be achieved by the following method (a) or (b):

(a) The thermoreversible display medium is prepared by heat drying at a temperature of 68° C. The recording layer then becomes transparent and makes the color of the medium the same as that of the colored support, i.e. black (or red). Next, printing is performed on the medium by for example a thermal head heated to a temperature of 76° C. or above. This makes the printed area opaque with white color so that the colored support is no longer visible. An image is thus obtained consisting of white printed areas on a black (red) background.

(b) Conversely to the method in (a), the thermoreversible display medium is prepared by heat drying at a temperature of 76° C. or above. This makes the recording layer white, so the medium looks white. Next, writing is performed on the medium by a heat pen heated to a temperature of 68° C. This makes the areas which were written upon (printed area) transparent so that the colored support is visible only through these areas. An image is thus obtained consisting of black (red) printed areas on a white background.

An example of an image recording device comprising a display medium based on a material whose transparency varies according to its thermal history, and an erasure means to erase the image formed on this display medium, is disclosed for example in Japanese Patent Kokai Publication No. 57-92370 and Japanese Patent Kokai Publication No. 57-89992.

In the image recording device disclosed in Japanese Patent Kokai Publication No. 57-92370, the display medium comprises a recording layer formed from a material having the same temperature-transmittance variation properties as those of FIG. 1. The recording means comprises a writing instrument with a heat head for recording, and the erasure means comprises an erasing instrument with a heat sliding surface.

In this device, an image is formed when a person holding the writing instrument brings its heat head into contact with the display medium, and the image is erased when the heat sliding surface of the erasing instrument is brought into contact with the image. If this device is used to form an image by the opaque recording method, the temperature of the writing instrument is set at $T_2$ or above, and the temperature of the erasing instrument is set in the range $T_0$–$T_1$. If on the other hand, an image is formed by the transparent recording method, the temperature of the writing instrument is set in the range $T_0$–$T_1$, and the temperature of the erasing instrument is set at $T_2$ or above.

In the image recording device disclosed in Japanese Patent Kokai Publication No. 57-89992, the display medium comprises a recording layer formed from a material having the same temperature-transmittance variation properties as those of FIG. 1. The recording means comprises a head consisting of a plurality of resistive heating elements, and the erasure means comprises a fluid bath whose temperature can be controlled. The display medium is in the form of an endless loop, and it is advanced by a drive means such as roller through a certain area including the recording section and erasure section. In this device, an image is formed when the head consisting of a plurality of resistive heating elements comes into contact with the display medium, and and the image is erased when the display medium is immersed in the fluid bath. More specifically, this publication describes an example of image formation by the transparent recording method. In this case, the temperature of the recording means is set within the range 65°–70° C., and the temperature of the fluid bath is set at 80° C. or above.

However, conventional thermoreversible display media (including the display medium used in the above conventional image recording device) have the property that when they are heated to a temperature $T_2$ or above and then cooled, they become white, while if they are heated to a temperature in the range $T_1$–$T_2$ and then cooled, they become transparent. Moreover, the temperature range $T_1$–$T_2$ required to obtain transparency was no more than 2°–10° C. or so. To form an image on this thermoreversible display medium by the transparent recording method, it was therefore necessary to control the temperature of the recording means consisting of said writing instrument or head to within 2°–10° C. or so of the specified temperature. The writing instrument, head or other part used for printing is however extremely small, and it is very difficult to control the temperature of such a small part precisely.

In the opaque recording method, on the other hand, the conventional display medium becomes opaque at a temperature $T_2$ and above, and as this temperature range is very large, the problem of controlling the temperature of the recording means is avoided. In this case, however, white printed areas appear on a transparent background, or white printed areas appear against a background which has the color of the colored support. If the contrast between the background and the printed areas is low, therefore, the display is very difficult to see. If the color density of the colored support was increased to improve the quality of the display, it caused eye fatigue because the area of the background is greater than that of the printed areas; while if, on the other hand, the color density of the colored support was decreased, the contrast declined. In either case, therefore, the opaque recording method was not a desirable recording method.

Use of the above-described thermoreversible recording medium in an image forming device utilizing electrophotography has been proposed.

The proposed device charges the surface of a photosensitive member, thermally writes on a thermoreversible recording medium, forms image and non-image portions depending on the difference in transmittance, and performs whole-surface exposure on the photosensitive member, with the thermoreversible recording medium superimposed thereon, to form an electrostatic latent image on the surface of the photosensitive drum.

Developing the electrostatic latent image and transferring to and fixing on the resultant toner image on recording medium, recording is made on ordinary paper.

FIG. 3A to FIG. 3F show the processes of image formation in the above image forming apparatus. FIG. 3A shows the thermal writing process, FIG. 3B shows the charging process, FIG. 3C shows the whole-surface exposure process, FIG. 3D shows the development process, FIG. 3E shows the transfer process, and FIG. 3F shows the fixing process.

In the above-described image forming processes, thermal writing is first conducted on a thermoreversible recording medium 23 moving over a platen roller 22 using heat-emitting elements 21. As a result, an image represented by differences in density or transmittance is formed on the thermoreversible recording medium 23. That is, the thermoreversible recording medium 23, the entirety of which initially assumed the opaque state as indicated by hatching, now have image portions 24 (unhatched portions) into which thermal writing has been conducted, and non-image portions 25 (hatched portions) into which thermal writing has not been conducted and which assume the opaque state (FIG. 3A).

The photosensitive member 26 is uniformly charged by means of a charging means, i.e., a corona charger 27 (FIG. 3B). In the illustrated example, a positive-type photosensitive material is employed, and positive charges are accumulated on the surface of the photosensitive member 26. The photosensitive member 26 is formed of a conductive support **26*a* and a photoconductive layer 26*b* formed over the conductive support 26*a***.

Next, the thermoreversible recording medium 23 is superimposed on the photosensitive member 26, which is then subjected to whole-surface exposure through the thermoreversible recording medium 23 by means of a whole-surface exposure means 28. Then, the photosensitive member 26 is irradiated with light in an amount dependent on the image represented by the differences in the density or transmittance. In the illustrated example, the image portions 24 (unhatched portions) are transparent, so light passes therethrough to irradiate the photosensitive member 26 and to remove the charges from the photosensitive member 26. The non-image portions (hatched portions) are opaque, so amount of light which passes therethrough is limited and the charges on the photosensitive member 26 are retained. As a result, the electrostatic latent image on the photosensitive member 26 is formed (FIG. 3C).

In the developing process (FIG. 3D), electric lines of forces are created in the space between the developing roller 29 and the photosensitive member 26, due to the electrostatic latent image. The charged toner 30 on the developing roller 29 is attracted to the photosensitive member 26, moves along the electric lines of force and is attached to the photosensitive member 26. Thus, a toner image is formed on the photosensitive member 26. In the illustrated example, reversal development is performed.

In the transfer process (FIG. 3E), a recording medium 31 is superimposed on the photosensitive member 26, and the toner image on the photosensitive member 26 is eletrostatically transferred to the recording member 31 by means of a corona charger 32.

In the fixing process (FIG. 3F), the toner image on the recording medium 31 is heated and melted by a fixing means 33, i.e., a heating roller 34 and a fixing roller 35. The molten toner 30 permeates the fibers of the recording medium 31 and is fixed by application of pressure.

In the image forming apparatus of the above configuration, the range of temperature in which the thermoreversible recording medium 23 is made transparent is narrow, so it is difficult to regulate the temperature within the above range even through control of the current value and the resistance of the thermal head, and obtain constant transmittance when the image forming is repeated.

Moreover, the transmittance is determined by the ratio of the matrix component and the organic substance of low molecular weight, and when the content of the organic substance of low molecular weight is high the transmittance in the transparent state is low, while when the content of the organic substance of low molecular weight is low the density in the opaque state is low, so a sufficient contrast is not obtained.

Moreover, when the prior-art thermoreversible recording medium 23 was used, it is necessary to control the heat-emitting recording elements to maintain the thermoreversible recording medium 23 within the narrow range of from $T_1$ to $T_2$, and such control is difficult.

OBJECT OF THE INVENTION

An object of the invention is to provide a thermoreversible recording medium having a wider range of temperature in which it can be made transparent, and having a larger contrast between transparent and opaque areas.

Another object of the invention is to provide an image forming apparatus employing a thermoreversible recording medium having a wider range of temperature for the transparent state, and a high contrast between the transparent and opaque areas.

A further object of the invention is to provide a method of fabrication of a thermoreversible recording medium having a wider range of temperature in which it can be made transparent, and having a larger contrast between transparent and opaque areas.

SUMMARY OF THE INVENTION

A thermoreversible recording medium according to an embodiment, called Embodiment A, of the invention comprises a matrix material and an organic substance of low molecular weight, said matrix material being a copolymer of styrene and butadiene, and said organic substance of low molecular weight being a saturated carboxylic acid.

A thermoreversible optical recording medium according to another embodiment, called Embodiment B1, comprises a recording layer of a matrix material and an organic substance of low molecular weight, and a heat generating layer which absorbs light to generate heat, said matrix material being a copolymer of styrene and butadience, and said organic substance of low molecular weight being a saturated carboxylic acid.

A thermoreversible optical recording medium according to a further embodiment, called Embodiment B2, comprises a matrix material, an organic substance of low molecular weight and a substance which absorbs light to generate heat, said matrix material being a copolymer of styrene and butadiene, and said organic substance of low molecular weight being a saturated carboxylic acid.

A thermoreversible display medium according to a further embodiment, called Embodiment C1, comprises a colored support member, and a recording layer whose transparency varies according to its thermal history and which is provided on the support member, said recording layer containing a matrix material formed from styrene/butadiene copolymer, and a saturated carboxylic acid.

The saturated carboxylic acid used in Embodiments A, B1, B2 and C1 may be capric acid, lauric acid, myristic acid, palmitic acid, stearic acid, arachic acid, behenic acid or lignoceric acid, although this list is not exhaustive. These compounds are saturated carboxylic acids with 10–24 carbon atoms.

If the amount of saturated carboxylic acid with respect to 1 part of matrix material is greater than 1 part by weight, it is difficult to form the recording layer, while if it is less than 1/20 parts thermoreversibility is poor. It is therefore desirable that the blending ratio of matrix material to saturated carboxylic acid is in the range 1:1–20:1.

In addition to styrene/butadiene copolymer and a saturated carboxylic acid, the thermoreversible recording medium in Embodiments A, B1, B2 and C1 may also contain other substances in order to improve the film properties of the recording layer or to improve lubrication.

There is no particular restriction insofar as concerns the colored support of the thermoreversible display medium of Embodiment C1. specific examples however are a substrate of a suitable material coated with a colored dye, a film of a suitable material coated wit a colored dye, a substrate made by blending with and kneading with colored dyes, a film made by blending and kneading with colored dyes and a color coat used for printing purposes. These may be procured commercially or manufactured.

To form a recording layer on a substrate or on a colored support member in Embodiments A, B1, B2 and C1, it may be necessary or desirable to prepare a coating solution. This coating solution may be obtained by dissolving the matrix material and saturated carboxylic acid in a solvent. The solvent may be tetrahydrofuran, methyl ethyl ketone, methyl isobutyl ketone, chloroform, carbon tetrachloride, ethanol, toluene or benzene, or a mixture of two or more these solvents, although this list is not exhaustive. The coating solution may also be heated if necessary.

The thermoreversible recording media of Embodiments A, B1, B2 and C1 exhibit maximum transparency when they are heated above a certain temperature $T_3$ (but less than the melting point of the matrix material) and cooled, and exhibit minimum transparency when they are heated to within a certain temperature range ($T_1$–$T_2$) lower than $T_3$ and cooled (FIG. 4). The relative magnitude between the temperature range for making the thermoreversible recording medium transparent and the temperature range for making it opaque are therefore reverse to that of the conventional media.

An image recording device of a further embodiment comprises a display medium of Embodiment C1, a recording means to form an image on this medium, and an erasure means to erase the image formed on this medium.

In this Embodiment, it is preferable that the erasure means comprises a local erasure means to erase only part of the images on the display medium, and a whole-surface erasure means to erase all of them.

An image forming apparatus according to a further embodiment of the invention comprises a corona charger for charging the surface of the photosensitive member, a heat-emitting recording device for thermally writing on a thermoreversible recording medium of Embodiment A1 described above, a whole-surface exposure means for exposing the photosensitive member, with the thermoreversible recording medium superimposed thereon, a developing device for developing a toner image on the photosensitive member, a corona charger for transferring the toner image onto a recording medium, with the photosensitive member and the thermoreversible recording medium being superimposed with each other, and a roller for fixing the toner images on the recording medium.

As the thermoreversible recording medium with image portions and non-image portions having been formed thereon is superimposed with the photosensitive member, and subjected to irradiation of light by a whole-surface exposure, an electrostatic latent image is formed on the photosensitive member. By development of the electrostatic latent image, a toner image is formed. The toner image is transferred to and fixed on the recording medium by the transfer means and the fixing means, and an image is thereby formed on the recording medium.

DETAILED DESCRIPTION OF THE PREFERRED EMBODIMENTS

We shall now describe embodiments of the invention with reference to drawings. It should however be understood that these drawings are only schematic representations to show the dimensions, shapes and relative positions of component parts to the extent necessary to comprehend the invention. Further, it should be understood that the materials used in this Embodiment and numerical conditions are merely given as illustrations, and the invention is in no way limited to these materials and numerical conditions.

Embodiment A

We shall first describe a thermoreversible recording medium of an embodiment, called Embodiment A, of this invention.

In this Embodiment A, the styrene/butadiene copolymer is ASUMA (commercial name) manufactured by Asahi Kasei Kogyo, Japan. Further, in this Embodiment A, the saturated carboxylic acid is stearic acid. The coating solution used for forming the recording layer of this Embodiment A was prepared by dissolving 2 parts by weight of ASUMA and 1 part by weight of stearic acid in 20 parts by weight of tetrahydrofuran (referred to hereafter as THF).

A coating solution of a Comparative Example A1 was prepared by exactly the same procedure as in the above Embodiment A, except that no stearic acid was used, that is by dissolving 2 parts by weight of ASUMA in 20 parts by weight of THF.

Further, a coating solution of a Comparative Example A2 was prepared by exactly the same procedure as in the above Embodiment A, except that 2 parts by weight of vinyl chloride/vinyl acetate copolymer (VYHH manufactured by Union Carbide Corporation (UCC)) were used instead of ASUMA.

Next, the coating solutions of the Embodiment A, and of Comparative Examples A1 and A2, were coated by spin coating to a similar thickness onto similar substrates of polymethyl methacrylate that have been separately prepared.

Next, the coated substrates were dried at a temperature of 90° C. in air. The drying time was sufficient to remove the solvent THF.

In this way, specimens having a film of the thermoreversible recording medium of the Embodiment A, and of Comparative Examples A1 and A2, were formed.

Next, the specimens prepared in this Embodiment A, and in Comparative Examples A1 and A2, were heated, and the change of transparency of each with respect to temperature variation was measured.

Figure 4:
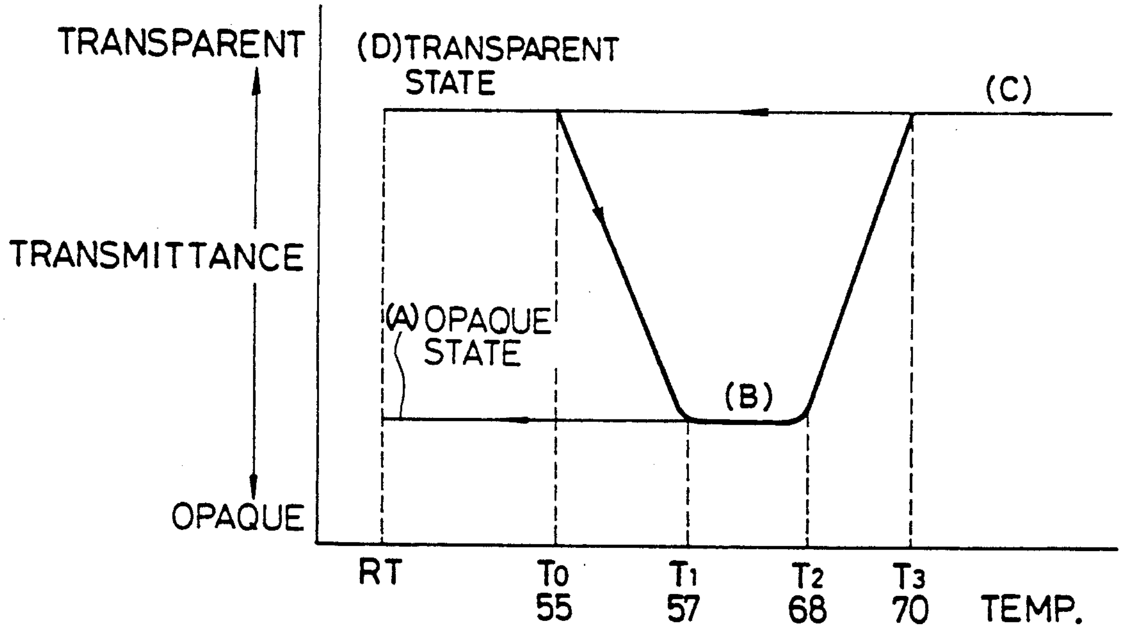
FIG. 4 is a hysteresis curve of the thermoreversible recording medium according to the invention.

FIG. 4 shows a hysteresis curve of transparency with respect to temperature for Embodiment A. The vertical axis is transmittance, and the horizontal axis is temperature.

As can be seen from FIG. 4, the specimen of the Embodiment A becomes transparent when it is heated to a temperature between 70° C. to 120° C., the latter temperature being the melting point of ASUMA, and when it is cooled to room temperature (approx. 25° C.), it remains transparent. Further, when the specimen of the Embodiment A is heated to a temperature between 57° C. and 68° C., it becomes opaque, and when it is cooled to room temperature it remains opaque.

Further, the transmittance ratio (contrast) between the transparent state and opaque state of the specimen of the Embodiment A (in this case, the transmittance ratio with respect to light of wavelength 550 nm) was found to be 4.2.

On the other hand the specimen of Comparative Example A1 was already transparent after it had been prepared, and it was found that it did not become opaque even when its temperature was varied in the range 20°-120° C. This indicated that it could not be used as a thermoreversible recording material.

Figure 1:
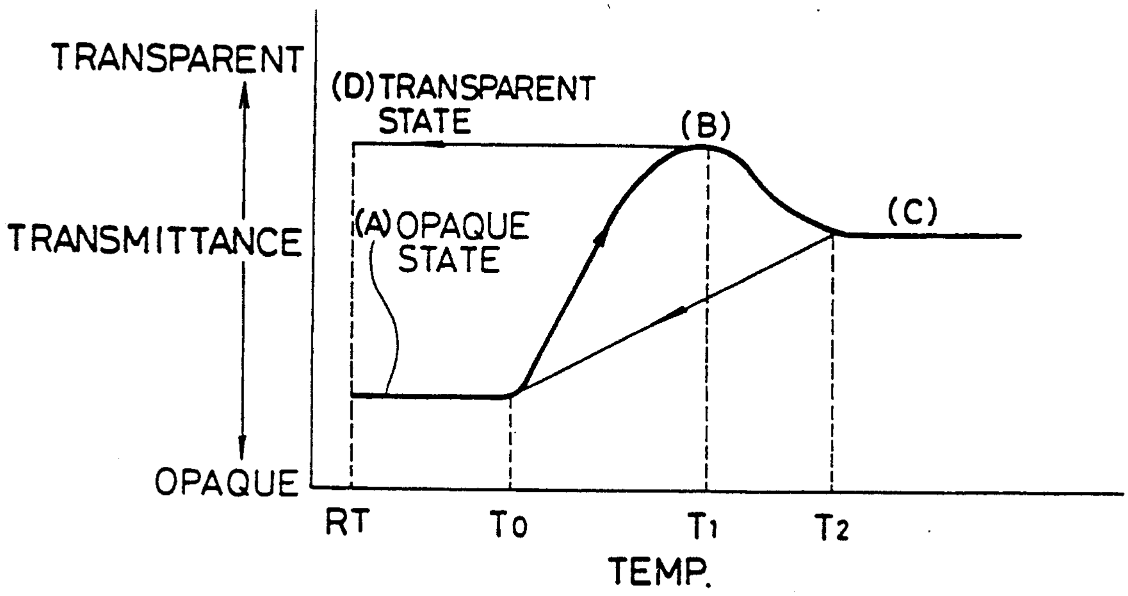
FIG. 1 PRIOR ART
FIG. 1 is a hysteresis curve of the thermoreversible recording medium in the prior art.
Figure 2A:
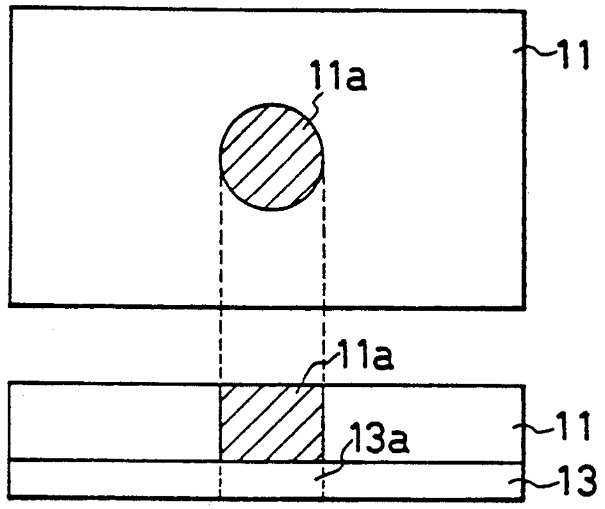
FIG. 2A PRIOR ART
FIG. 2A is a diagram for explaining the opaque recording method using the thermoreversible optical recording medium.
Figure 2B:
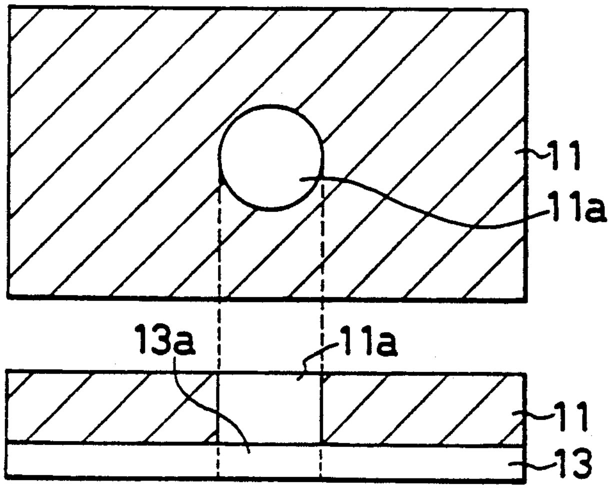
FIG. 2B PRIOR ART
FIG. 2B is a diagram for explaining the transparent recording method using the thermoreversible optical recording medium.
Figure 3A:
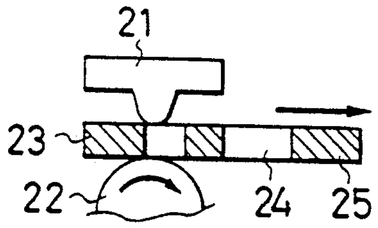
FIG. 3A to FIG. 3F are diagrams showing the process steps showing the sequence of the operation of the image formation in the image forming apparatus.
Figure 3B:
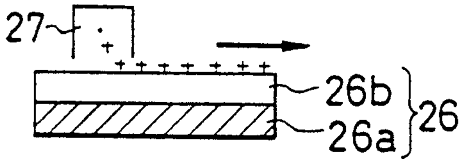
Figure 3C:
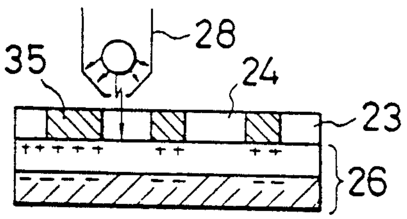
Figure 3D:
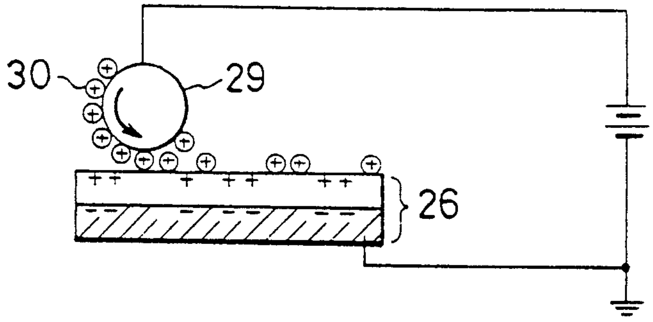
Figure 3E:
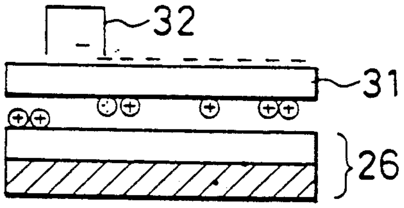
Figure 3F:
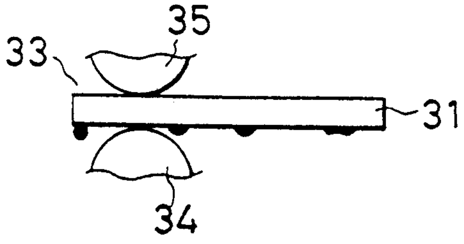

Further, the hysteresis curve of transparency versus temperature of the specimen of Comparative Example A2 was similar to that of conventional media shown in FIG. 1, and the temperature range for obtaining transparency was found to be 67°-70° C. which is very narrow. Further, the contrast of the specimen of Comparative Example A2 was found to be 2.9.

The characteristics of the specimens of the Embodiment A, the Comparative Example 1 and the Comparative Example 2 are shown in Table 1.

TABLE 1

| SPECIMEN | TEMPERATURE FOR MAKING THE MEDIUM TRANSPARENT | CONTRAST |
|---|---|---|
| EMBODIMENT 1 | 70 to 120° C. (ΔT = 50° C.) | 4.2 |
| COMPARATIVE EXAMPLE 1 | Does not become Transparent | — |
| COMPARATIVE EXAMPLE A2 | 67 to 70° C. (ΔT = 3° C.) | 2.9 |

As is clear from Table 1, the thermoreversible recording medium according to the invention has a range of temperature in which the transparency is attained which is as wide as about 17 times that of the reversible thermosensitive recording medium of Comparative Example 2, and is as wide as about 3 times the maximum temperature range (between 10° and 20° C.) in the prior art. Further, the contrast is about 1.5 times that of the Comparative Example A2.

As has been described, according to the Embodiment A described above, the matrix material consists of styrene-butadiene copolymer, and an organic material of low molecular weight dispersed in the matrix material is a saturated carboxylic acid, and the range of temperature in which the transparent state is attained is wider and the contrast has been improved.

When the reversible thermosensitive recording medium is used in a display device in which a thermal head or other thermal means is used, and a transparent pattern is formed, the temperature control can be rough and the configuration of the device can be simple. Moreover, the contrast between the display portions and the background portions is larger, so the quality of the display is improved.

Embodiment B1

We shall now describe a thermoreversible optical recording medium of another embodiment, called Embodiment B1, of this invention.

Preparation of Thermoreversible Optical Recording Medium

In this Embodiment B1, the styrene/butadiene copolymer is ASUMA previously mentioned. Further, in this Embodiment B1, the saturated carboxylic acid is stearic acid. Further, in this Embodiment B1, as the substance which absorbs light to generate heat, carbon black is used.

The coating solution used for forming the recording layer of this Embodiment B1 was prepared by dissolving 2 parts by weight of ASUMA and 1 part by weight of stearic acid in 20 parts by weight of tetrahydrofuran (referred to hereafter as THF). The coating solution used for forming the heat generating layer of this Embodiment B1 was prepared by dissolving 1 part by weight of polyvinyl butyral (commercial name S-LEC) manufactured by Sekisui Chemical Company Limited, Japan, and 0.02 parts by weight of carbon black, in 10 parts by weight of THF.

A coating solution to form the recording layer of a Comparative Example B1 was prepared by exactly the same procedure as in the above Embodiment B1, except that 2 parts by weight of ASUMA were dissolved in 20 parts by weight of THF without the addition of any stearic acid.

Further, a coating solution to form the recording layer of a Comparative Example B2 was prepared by exactly the same procedure as in the Embodiment B1, except that 2 parts by weight of vinyl chloride/vinyl acetate copolymer (VYHH manufactured by Union Carbide Corporation) were used instead of ASUMA.

Next, the coating solution for forming the heat generating layer of this Embodiment B1 was coated by spin coating to a specified thickness on a polymethyl methacrylate substrate. The substrates were then dried at a sufficient temperature and for a sufficient time to permit removal of THF. Thus, substrates having a heat generating layer were obtained.

Next, the coating solutions for forming the recording layers of the Embodiment B1, and of Comparative Examples B1 and B2, were coated by spin coating to a similar thickness onto the heat generating layers of separate polymethyl methacrylate substrates.

Next, the coated substrates were dried at a temperature of 90° C. in air. The drying time was sufficient to remove the solvent THF.

Figure 5A:
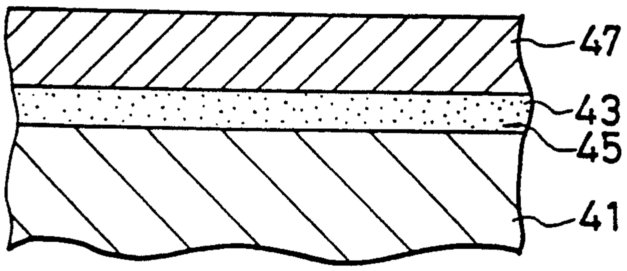
FIG. 5A is a sectional view showing the thermoreversible optical recording medium of another embodiment of the invention.

In this way, the thermoreversible optical recording media of the Embodiment B1, and of Comparative Examples B1 and B2, were formed. FIG. 5A is a schematic sectional view of one of the specimens obtained. In the figure, 41 is the substrate, 43 is the heat generating layer, 45 is a substance which absorbs light to generate heat and 47 is the recording layer.

Measurement of Thermoreversibility

Next, the specimens prepared in this Embodiment B1, and in Comparative Examples B1 and B2, were heated directly, and the change of transparency of each with respect to temperature variation was measured.

The hysteresis characteristics of transparency with respect to temperature for each specimen is as shown in FIG. 4.

As can be seen from FIG. 4, the specimen of the Embodiment B1 becomes transparent when it is heated to a temperature between 70° C. to 120° C. which is the melting point of ASUMA, and when it is cooled to room temperature (approx. 25° C.), it remains transparent. Further, when the specimen of the Embodiment B1 is heated to a temperature between 57° C. and 68° C., it becomes opaque, and when it is cooled to room temperature it remains opaque.

The transmittance ratio (contrast) between the transparent state and opaque state of the specimen of the Embodiment B1 (in this case, the transmittance ratio with respect to light of wavelength 550 nm) was found to be 4.2.

On the other hand the speciment of Comparative Example B1 was already transparent after it had been prepared, and it was found that it did not become opaque even when its temperature was varied in the range 20°-120° C. This indicated that it could not be used as a recording material.

Further, the hysteresis curve of transparency versus temperature of the specimen of Comparative Example B2 was similar to that of conventional media shown in FIG. 4, and the temperature range for obtaining transparency was found to be 67°-70° C. which is very narrow. Further, the contrast of the specimen of Comparative Example B2 was found to be 2.9.

It is thus seen that the temperature range for obtaining transparency with the thermoreversible optical recording medium of this invention is approximately 17 times wider compared to the medium of Comparative Example B2, and approximately 3 times wider than the maximum temperature range of conventional recording media disclosed in Japanese Patent Kokai Publication No. 55-154198 mentioned above. In addition, the recording medium of this invention offers a contrast improvement of approx. 1.5 times compared to the specimen of Comparative Example B2.

Recording, Reproduction and Erasure

Next, the performance of the thermoreversible optical recording medium of the Embodiment B1 was verified with respect to recording, reproduction and erasure as follows. When it was prepared, the recording medium of the Embodiment B1 was opaque. We shall therefore describe the processes of recording, reproduction and erasure for the case of transparent recording, but it should be noted that opaque recording may also be performed. The light source used was an AlGaAs semiconductor laser with an oscillation wavelength of 820 nm.

Recording

When the recording layer 47 of the specimen of the Embodiment B1 (FIG. 5A) was irradiated from above with said laser of power 6 mW and beam diameter 10 μm for an irradiation period of 0.1 msec, heat generating layer 43 rose to a temperature of approx. 100° C. which corresponds to the temperature above $T_3$ in FIG. 4, and a transparent area of diameter 10 μm was formed in the part of recording layer 47 in contact with the heat generating layer. The area surrounding the transparent area of recording layer 47 was at a temperature below $T_0$ in FIG. 4, and remained opaque. This confirms that transparent bits can be recorded on the medium.

Reproduction

When the specimen of the Embodiment B1 which had been recorded by the above procedure, was irradiated by said laser at a reduced power of 2 mW and beam diameter 5 μm, the temperature of the transparent and opaque areas did not rise above $T_0$ in FIG. 4, and there was no change of transparency. Further, as the substrate 41 (FIG. 5A) consists of polymethyl methacrylate which is transparent (transmittance 93%) to laser light, the laser light was able to reach a light receiving device underneath said substrate when it impinged on the transparent area of the specimen, and the recording could thus be read. When laser light impinged on the opaque area, however, it was absorbed by the specimen and did not reach the light receiving device. Different signals are thus obtained from the transparent area and opaque area, which confirms that reading of the recording or reproduction is possible.

Erasure

An area comprising a transparent area of the specimen of the Embodiment B1 which had been recorded by the above procedure, was irradiated by said laser at a power of 4 mW and beam width 20 μm. This caused the temperature of the area of the heat generating layer corresponding to the transparent area to reach a temperature between $T_1$ and $T_2$ in FIG. 4 (in this case approx. 65° C.). As the area of the heat generating layer outside the transparent area which had been irradiated received laser light through an opaque area, there was no effective heating due to the laser light, its temperature was below that of the transparent area and also below $T_0$ in FIG. 4 (in this case, 55° C.). The transparent area alone can therefore be returned to the opaque state while the opaque area remains unchanged. Thus, it has been confirmed that the recording can be erased.

The following modifications of the thermoreversible recording medium of this invention can be envisaged.

Figure 5B:
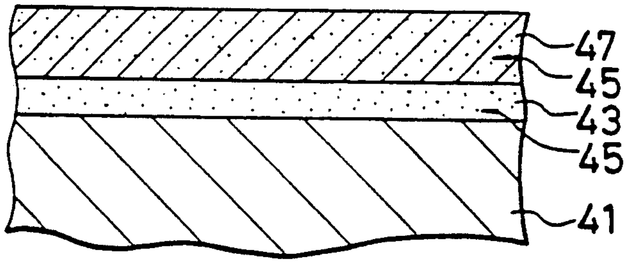
FIG. 5B is diagram showing a modification of the thermoreversible optical recording medium of FIG. 5A.

In the above thermoreversible optical recording medium, the transparency of the recording layer does not vary because the layer itself generates heat, but rather because it receives heat from the heat generating layer. A substance which absorbs light to generate heat may however be dispersed in the recording layer to improve heating efficiency. FIG. 5B is a schematic sectional view of such a thermoreversible recording medium. In the figure, carbon black 45 is dispersed also in recording layer 47.

Embodiment B2

Figure 5C:
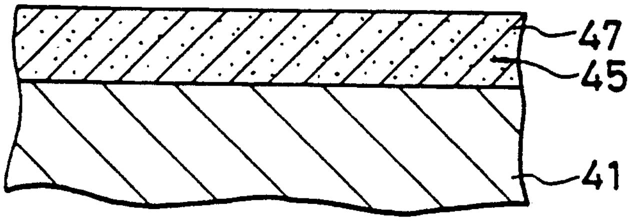
FIG. 5C is a diagram showing the thermoreversible recording medium of a further embodiment of the invention.

Further, the thermoreversible optical recording media shown in FIG. 5A and FIG. 5B have separate recording and heat generating layers, but the recording medium may have a recording layer which is also a heat generating layer. FIG. 5C is a schematic sectional view of such a thermoreversible optical recording medium, called Embodiment B2. In the figure, the recording layer 47 similar to that of of Embodiment B1 is provided on a substrate 41, and this layer 47 contains carbon black 45 which absorbs light to generate heat. The arrangement of Embodiment B2 provides the same effect as that of Embodiment B1.

Further, in the Embodiments B1 and B2, we have described the case where the thermoreversible optical recording medium is provided with a substrate. Depending on the design, however, the heat generating layer itself or the recording layer itself may constitute the substrate.

Further, in the Embodiment B1, the heat generating layer and recording layer were provided in the stated order on the substrate, but depending on the design, this order may be modified.

As will be clear from the above descriptions, the thermoreversible optical recording media of the Embodiments B1 and B2 exhibit maximum transparency when they are heated above a certain temperature $T_3$ (but less than the melting point of the matrix material) and cooled, and exhibit minimum transparency when they are heated to within a certain temperature range ($T_1$–$T_2$) lower than $T_3$ and cooled. The relative magnitude between the temperature range for making the thermoreversible optical recording medium transparent and the temperature range for making it opaque is reverse to that of the conventional media.

The results are as follows:

(1) When recording is performed by the transparent recording method in the case of conventional thermoreversible optical recording media, the temperature of the medium had to be set to within a very narrow range (of about 10 degrees or so at most) in order to form a transparent area. In the case of the medium of this invention, however, the temperature of the required area of the heat generating layer need only be raised to above a temperature $T_3$ (but lower than the melting point of the matrix material).

(2) Further, when the transparent area in transparent recording is made opaque (to erase the recording) in the thermoreversible optical recording medium of this invention, the temperature of the heat generating layer corresponding to the transparent part must be controlled within a range $T_1$ –$T_2$ (in the Embodiments B1 and B2, within 57°–68° C.). In this case, however, as parts of the heat generating layer outside the transparent area lie underneath an opaque area, there is no risk that the temperature of those parts of the heat generating layer will rise above $T_3$ even if the laser spot is made larger than the size of the transparent area. It is therefore necessary only to control the temperature of the transparent area in order to erase the recording.

(3) When the thermoreversible optical recording medium of this invention is applied to the opaque recording method, the opaque spots can be erased simply by raising the temperature of the whole heat generating layer above $T_3$.

The thermoreversible optical recording medium of this invention therefore permits recording and erasure to be performed with more reliability and ease than in the case of conventional media regardless of which recording method is used.

Further, contrast is better than with conventional media, so high reliability of reproduction is achieved.

Further, the thermoreversible optical recording medium of this invention is less costly than thermal magneto-optic recording media employing metal materials, and as there is a large difference between transparent bits and opaque transparent bits, reliability of reproduction is improved.

The thermoreversible optical recording media the of Embodiments B1 and B2 are therefore especially suitable for those applications where it is necessary to update information, as in the case of computer files for example.

Embodiment C1

We shall now describe a thermoreversible display medium of a further embodiment, called Embodiment C1.

Firstly, the colored support in the thermoreversible display medium of this Embodiment C1 comprises a substrate and a colored layer provided on this substrate. This colored support member is manufactured as follows.

As substrate, a methacrylic resin (in this case, Comoglass manufactured by Kyowa Gas Kagaku Kogyo, Japan) is used. A solution, prepared by dissolving vinyl chloride/vinyl acetate copolymer (VYHH manufactured by Union Carbide Corporation) as binder and cadmium red as colored dye in tetrahydrofuran, is coated onto this substrate. When the coated film is dried, a colored support comprising a red colored layer on a substrate is obtained. The blending ratio of binder resin and colored dye is determined by the degree of coloration and film properties of the colored layer desired.

The recording layer provided on the colored support thus obtained, is prepared as follows. In this Embodiment C1, for the styrene/butadiene copolymer in the recording layer, ASUMA previously mentioned is used, and for the saturated carboxylic acid, stearic acid is used.

Firstly, 2 parts by weight of ASUMA and 1 part by weight of stearic acid are dissolved in 20 parts by weight of tetrahydrofuran to prepare the coating solution used to form the recording layer. This coating solution is then coated onto the above colored support and dried to give the thermoreversible display medium of this Embodiment C1, which consists of a recording layer on a colored support.

The thermoreversible display medium of this Embodiment C1 was heated and cooled under the conditions described below, and the variation of transparency with variation of temperature was measured.

The hysteresis characteristics of variation of transparency with temperature of the thermoreversible display medium of this Embodiment C1 is as shown in FIG. 4.

As can be seen from FIG. 4, when the thermoreversible display medium of this Embodiment C1 is heated to a temperature in the range 70° C. to 120° C. which is the melting point of ASUMA, the recording layer becomes transparent to display the color of the colored support underneath, and when cooled to room temperature (approx. 25° C.), the red color remains visible. Further, when the thermoreversible display medium of this Embodiment C1 is heated to a temperature within the range 57° C. to 68° C., the recording layer becomes opaque (with white color) so that the red color of the colored support is no longer visible, and when cooled to room temperature, it remains opaque.

Figure 6:
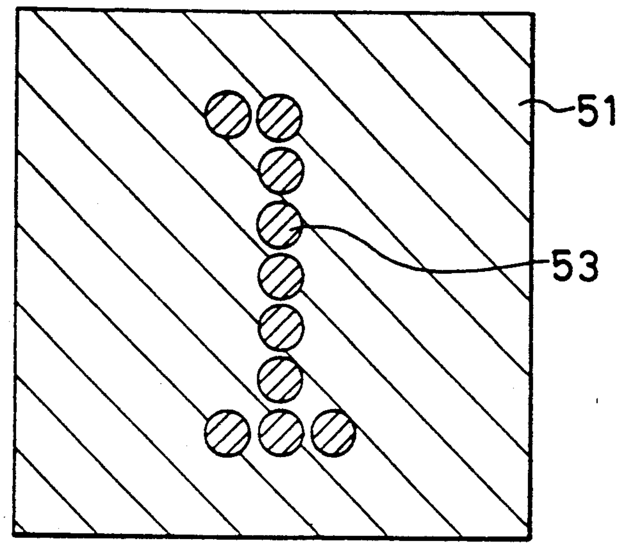
FIG. 6 is a diagram showing an example of image formation.

When the thermoreversible display medium of this example was heated to 63° C. and cooled to room temperature to produce a white screen, and certain areas of this white screen were then heated and printed by a thermal head heated to a temperature within the range 70° C.–120° C., the red color of the colored support was therefore visible only through the printed areas while other areas remained white. An image consisting of red printed areas on a white background was thus obtained. FIG. 6 is a drawing of such an image comprising a white (opaque) background 51 and printed areas 53.

Further, when the thermoreversible display medium was re-heated to 63° C. after forming an image, a white screen was again obtained.

The thermoreversible display medium of Embodiment C1 therefore permits repeated image formation and erasure, and since the temperature range required to make the recording layer transparent is wide, that is 70°-120° C., formation of an image by the transparent method is facile.

In the above example of the thermoreversible display medium, the colored support is a laminate comprising a substrate and a colored layer. It is not however essential that the colored support has a laminar structure, and it may instead consist of a colored sheet or film.

Embodiment C2: Image Recording Apparatus

Figure 7:
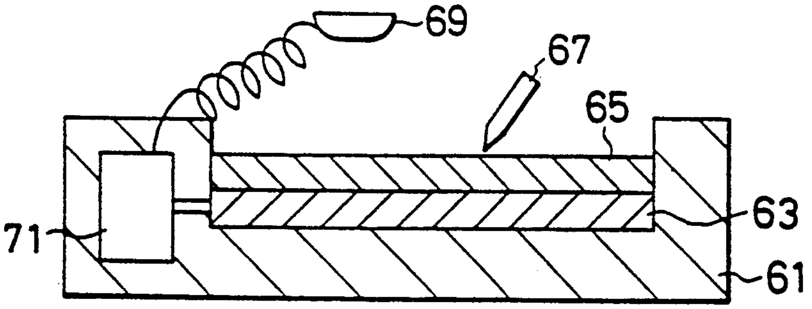
FIG. 7 is a diagram showing the configuration of an image recording apparatus of a further embodiment of the invention.
Figure 8:
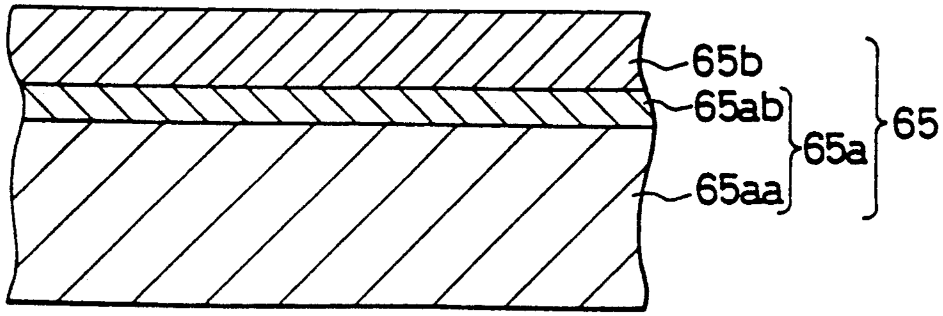
FIG. 8 is a diagram for explaining a display member of the image recording apparatus of the above embodiment.
Figure 9:
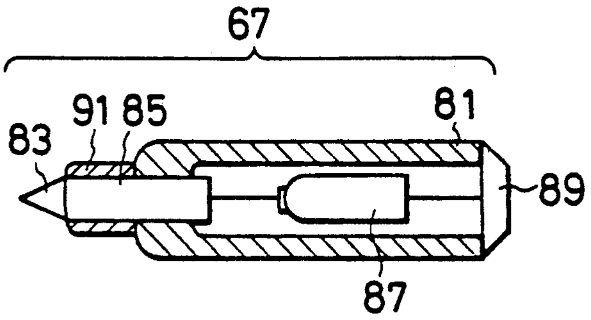
FIG. 9 is a diagram for explaining the local erasure member.
Figure 10:
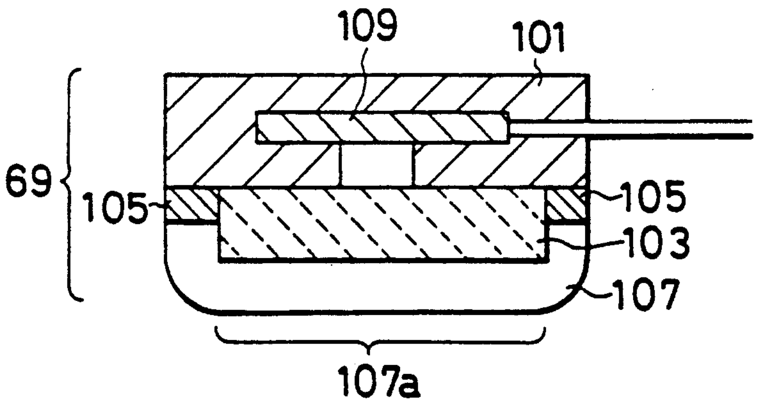
FIG. 10 is a diagram showing the configuration of a local erasure member.

An image recording apparatus of a further embodiment, called Embodiment C2, will now be described with reference to FIGS. 7 to 10. FIG. 7 is a sectional view showing the overall structure of the image recording apparatus of the first embodiment. FIGS. 8 to 10 are sectional views of a display member, a recording member and an erasure section provided in the apparatus.

The image recording apparatus comprises a frame 61, a whole-surface erasure member 63 provided on the frame 61 and formed of a plate-shaped heat-emitting member for erasing the whole-surface of the display member, and the display member 65 provided in contact with the whole-surface erasure member 63, a writing instrument 67 as a recording member for forming an image on the display member 65, a local erasure member 69 for erasing part of the image that has been formed on the display member, and a temperature controller 71 for controlling the temperature of the entire erasure member.

The frame 61 is formed of a material, such as metal, resin or the like, suitable for the design of the image recording apparatus.

The whole-surface erasure member 63 can be formed, for example, of a panel heater. As the range of temperature in which the thermoreversible recording medium constituting the display member 65 is made opaque (white) is 57° to 68° C., so, during the erasure operation, the whole-surface erasure member 63 is controlled to be within the above range temperature. The temperature control is conducted by the temperature controller 71. The temperature controller 71 can be formed of any known means.

As illustrated in FIG. 8, the display member 65 comprises a colored support 65*a*, a recording layer 65*b* provided on the upper side of the colored support 65*a* (in the illustrated embodiment, on the colored support 65*a*) and formed of a matrix material consisting of styrene/butadiene copolymer and including a saturated carboxylic acid. More specifically, the display member 65 can be formed of the thermoreversible recording medium described in connection with the embodiment of the Embodiment C1. However, the colored support 65*a* need not be formed of a composite layer consisting of a substrate 65*aa* and a colored layer 65*ab*, but may alternatively formed of a substrate which itself is colored. When necessary, to increase the strength of the display member 65, a second substrate for enforcement may be provided in addition to the substrate 65*aa*. Still alternatively, the surface of the whole-surface erasure member 63 in FIG. 7 may be colored or a colored layer may be formed on the whole-surface erasure member 63, so that they also serve as the colored support.

As shown in FIG. 9, the writing instrument 67 as the recording member comprises a frame 81, a head section 83 provided at the tip of the frame 81, a heating section 85 for heating the head section 83, a power supply 87 for the heating section, an ON/OFF switch 89 as a power supply switch, and a thermal insulating section 91 for thermally insulating between the frame 81 and the heating section 85.

The frame 81 of the writing instrument 67 may preferably be in a cylindrical form, for example, as a human user holds it and use it for writing, and its material may be any suitable material.

The head section 83 of the writing instrument 67 is preferably formed of a material having a good thermal conductivity, such as copper or like metal, or ceramics, or the like. The shape of the head section 43 is preferably tapered, but its thickness is determined on the size of the characters and the like. It is of course convenient if the writing instrument is so formed that the head section is exchangeable and multiple heads having different thickness are provided and selectively used in accordance with the intended application.

The heating section 85 of the writing instrument 67 can be formed of a nichrome wire heater, ceramics heater, or other resistive heating members.

The heating section power supply 87 of the writing instrument 67 may be either a DC power supply or an AC power supply. In this embodiment, it is formed of three dry batteries (alkaline-manganese batteries) of the R6 type (according to IEC classification). In the illustrated embodiment, with the writing instrument 67, the display member 65 has a wide range of temperature, of 70° to 120° C., in which it is made transparent, so the head section 83 needs only to be controlled within the range of temperature of 70° to 120° C. Accordingly, the R6-type dry batteries are simply connected through the ON/OFF switch 89 to the heating section 85. That is, in the writing instrument 67, the temperature control is made by the setting of the current value flowing through the heating section 85, there being not provided any special temperature control means.

The ON/OFF switch 89 and the thermal insulating member 91 of the writing instrument 67 may be formed of any known member.

As shown in FIG. 10, the local erasure member 69 of the illustrated embodiment comprises a frame 101, a heating section 103, a thermal insulating member 105 for thermally insulating between the frame 101 and the heating section 103, a head section 107 heated by the heating section 103 and having a sliding surface 107*a* in contact with the display member 65, and a temperature control means 109 for controlling the temperature of the head section 107.

The frame 101 of the local erasure member 69 preferably has a shape like that of a plate portion (plate portion) of a chalk eraser. Its material may be any suitable material.

The heating section 103 of the local erasure member 109 may be formed, for example, of a heat-emitting resistor.

The head section 107 of the local erasure member 69 may be formed of any material having a good thermal conductivity.

The temperature control section 109 of the local erasure member 109 is responsive to a signal from a temperature measuring means (a thermocouple, for example) buried in the head section 107, for controlling the temperature of the head section 107 so that it is at a predetermined value. In this case, the range of temperature in which the thermoreversible recording medium constituting the display member 65 (FIG. 7) is made opaque (white-colored) is 57° to 68° C., so, during the erasure operation, the local erasure member 69 is so controlled that its sliding surface 107*a* contacting the display member 65 is within the above range of temperature.

According to the image recording apparatus of this Embodiment C2, when the whole-surface erasure member 63 operates, the recording layer of the display member becomes white-colored and when the operation of the whole-surface erasure member 63 is thereafter terminated, the recording layer is cooled and the display member is fixed to assume a white-colored screen.

When the writing instrument being in the ON state is brought to contact with the white-colored screen, the portions of the white-colored screen where the writing instrument contacted is made transparent, with the colored support being visible through the transparent portions. In the embodiment under consideration, red print portions are attained. As a result, an image consisting of white background and red print portions is formed.

When it is desired to erase part only of the image on the display member, the local erasure member 69 is contacted with such part.

Embodiment C3: Image Recording Apparatus

Figure 11:
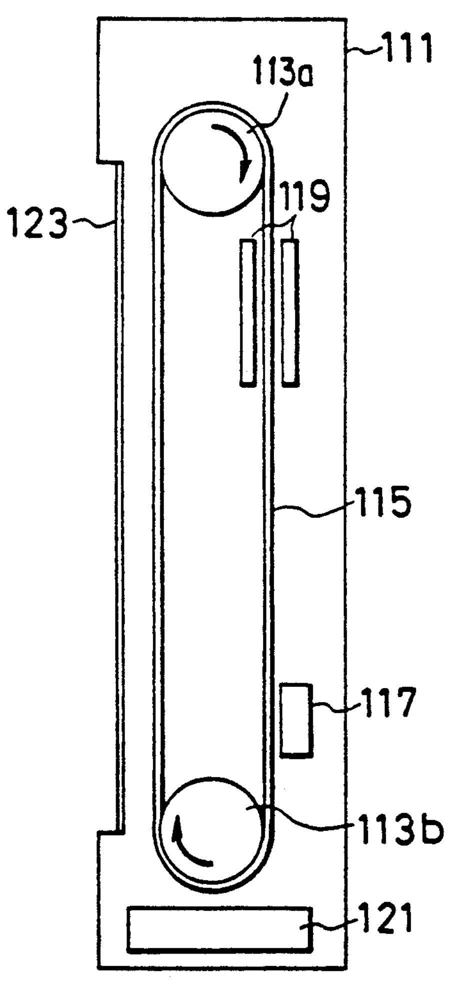
FIG. 11 is a diagram showing an image recording apparatus of a further embodiment of the invention.

An image recording apparatus of another embodiment, called Embodiment C3, will now be described with reference to FIG. 11, which is a side view schematically illustrating the overall structure of the image recording apparatus of Embodiment C3.

The image recording apparatus of Embodiment C3 comprises a frame 111, display member drive rollers 113*a* and 113*b*, a display member 115 formed of an endless (loop-shaped) thermoreversible recording medium comprising a colored support and a recording layer provided on the colored support and formed of a matrix material consisting of styrene-butadiene copolymer and containing a saturated carboxylic acid, a recording section 117 for forming an image on the display member 115, an erasure section 119 for erasing the image on the display member 115, and a control section 121 for performing control over temperature of the recording section, control over the print data of the recording section, control over the temperature of the erasure section and control over the operation of the display drive roller. In the image recording apparatus, a glass plate 123 is provided to protect the display member on the screen side.

In the illustrated embodiment, the display section 115 which is made to run by the rollers 113*a* and 113*b*, must have flexibility. Accordingly, the display medium 115 is manufactured as described below. Firstly, the coating solution of the Embodiment C1 prepared by dissolving vinyl chloride/vinyl acetate copolymer (VYHH manufactured by Union Carbide Corporation) and cadmium red in tetrahydrofuran, is coated onto a flexible film which in this Embodiment C3 consists of a polyester, and the result is dried to obtain a film-like colored support. Next, a recording layer containing ASUMA and stearic acid is formed on this film-like colored support as in the Embodiment C1, and a film-like display medium is thereby obtained.

The display member 115 in the form of film thus obtained has characteristics in which the range of temperature in which it is made transparent is 70° to 120° C. and the range of temperature in which it is made opaque is 57° to 68° C., as with the thermoreversible recording medium of Embodiment C1, and it has been found suitable for the transparent recording method, like the thermoreversible recording medium of Embodiment C1.

The recording section 117 is formed of a device which can selectively heat the display member 115 to a temperature of 70° to 120° C. in accordance with the image data from the control section 121. Specifically, it is formed of a thermal head.

The erasure section 119 of the illustrated embodiment is formed of a panel heater sandwiching the display member 115, and is controlled by the control section 121 to heat the display member 115 to a temperature within 57° to 68° C. at the time of erasure.

In the apparatus of the Embodiment C3, the display member drive rollers 113*a* and 113*b* under the control of the control section 121 makes the display member 115 to run along the predetermined cyclic course including the vicinity of the recording section 117 and the vicinity of the erasure section 119. The image forming on the display member 115 is made by the recording section 117 and the image erasure is made by the erasure section 119, both under the control of the control section 121. Accordingly, the apparatus is suitable for a large-screen display apparatus, and is for instance applicable as an electronic blackboard, a billboard, or a display for computers. Moreover, the apparatus of the Embodiment C3 permits recording by the transparent recording method.

In the image recording apparatus for the Embodiment C3, the writing instrument 67 and the local erasure member 69 described in connection with the Embodiment C2 may also be used. In such a case, the glass plate 123 is preferably capable of being opened and closed.

As has been described, in the thermoreversible recording apparatus of Embodiments C2 and C3 described above, the thermoreversible recording medium constitutes the display member of an image recording apparatus and exhibits the maximum transparency when heated above a specific temperature $T_3$ (but below the melting point of the matrix material) and is then cooled, and exhibits the minimum transparency when heated to a range of temperature ($T_1$ to $T_2$) lower than $T_3$. Compared with the prior art, the range of temperature leading to the transparent state and the range of temperature leading to the opaque state are reversed. Accordingly, the printing by the transparent recording method is facilitated.

As a result, the display is with a high contrast, which reduces eye's fatigue. Moreover, the control for the printing need not be accurate, so thermal heads which are inexpensive but whose temperature control is difficult can be used for the recording section, and the cost of the image recording apparatus can be lowered.

Embodiment D1

Figure 12:
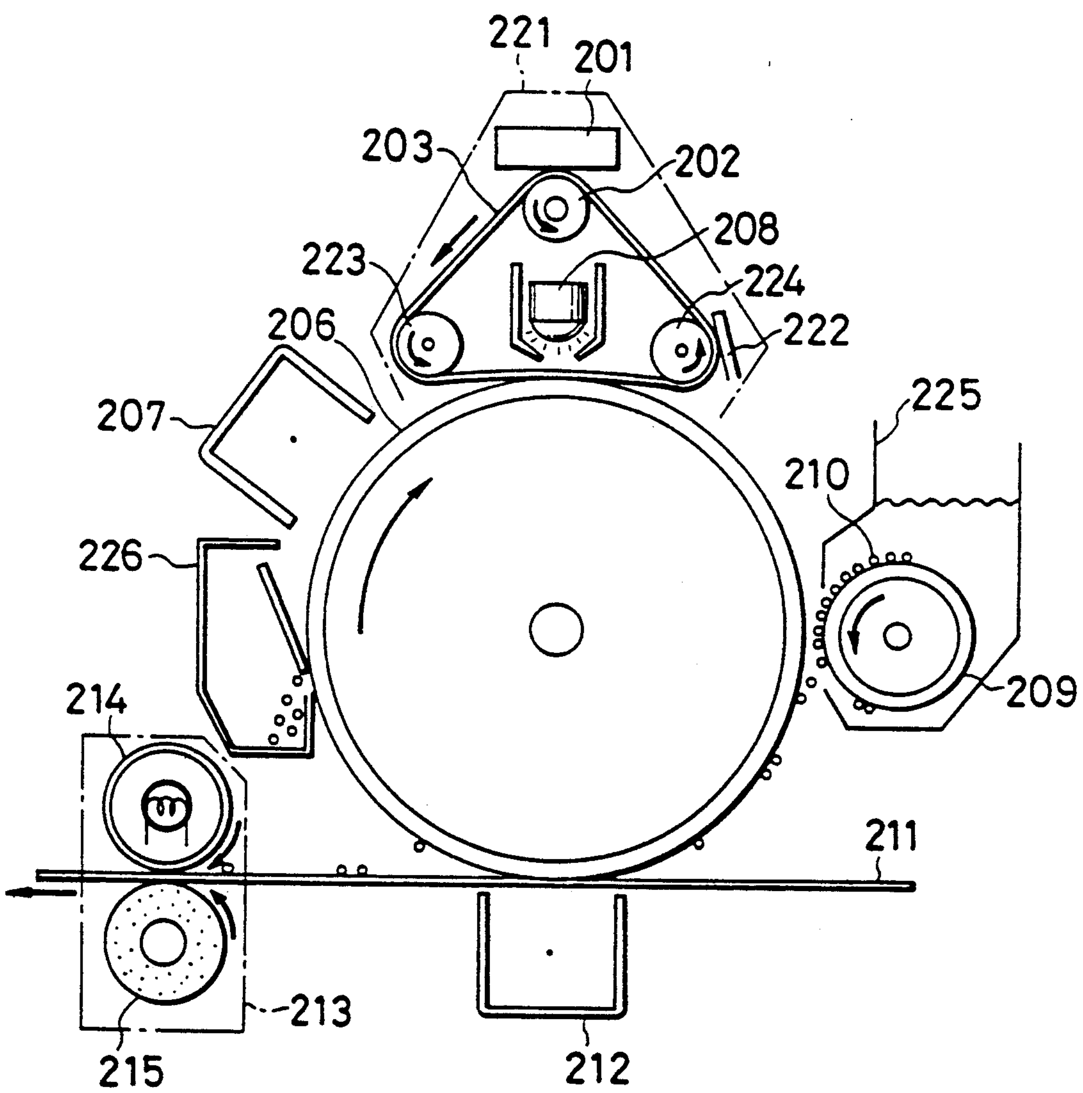
FIG. 12 is a schematic diagram showing an image forming apparatus of a further embodiment of the invention.

FIG. 12 is a schematic diagram showing an image forming apparatus of a further embodiment, called Embodiment D1, of the invention. The apparatus of this embodiment employs the thermoreversible recording medium of Embodiment A.

In the figure, 206 denotes a photosensitive member formed on a drum, and may comprise a selenium photosensitive member, an organic photosensitive member or any other photosensitive member.

207 denotes a corona charger constituting the charging means. It is disposed to face the surface of the photosensitive member 206. As the charging means, a brush charger may also be used.

221 denotes an exposure device. It is formed of a thermoreversible recording medium 203, a heat-emitting recording device 201, a whole-surface exposure means 208 and a whole-surface heat-emitting device 222. The thermoreversible recording medium 203 is passed around a platen roller 202, a first free roller 223, and a second free roller 224.

A heat-emitting recording device 201 is disposed on the side opposite to the platen roller 202 with respect to the thermoreversible recording medium 203, and the thermoreversible recording medium 203 is pressed between the heat-emitting recording device 201 and the platen roller 202. The heat-emitting recording device 201 is normally called a thermal head.

The whole-surface exposure device 208 is disposed over the thermoreversible recording medium 203 superimposed with and being in contact with the photosensitive member 206. As the whole-surface exposure device 208, a light source with a uniform light intensity, such as a fluorescent light, a halogen lamp, an LED array or the like may be used. The whole-surface heat-emitting device 222 is provided to press the thermoreversible recording medium 203 in cooperation with the second free roller 224. It may comprise any device having a uniform heat emission along its length.

The developing means 225 attracts toner 210 on its developing roller 209, transports the toner, and conducts development. It is disposed to face the photosensitive member 206. As the developing means 225, a two-component magnetic brush developer, a one-component magnetic brush developer, a one-component non-magnetic developer or the like may be used.

212 denotes a corona charger constituting the transfer means. It is disposed to face the surface of the photosensitive member 206 and transfers the toner 210 attached on the surface of the photosensitive member 206 onto the recording member 211. As the recording member 211, ordinary paper is used.

213 denotes a fixing means, which is formed of a heating roller 214 and a pressure roller 215. It fixes the toner 210 that has been transferred to the recording member 211. The heating roller 214 may comprise a hollow metal member with a halogen lamp disposed therein, or a metal surface and a heating emitting member provided at the metal surface.

226 denotes a cleaning means for removing any toner 210 remaining on the photosensitive member 206 after the transfer process. Apart from the illustrated blade cleaning device, any other known technique may be used.

The photosensitive member 206 and the platen roller 202 are rotated, by a means not shown, in a direction indicated by the arrow, at a constant circumferential speed. The thermoreversible recording medium 203 is passed around the patent roller 202, the first free roller 223 and the second free roller 224 so that it is in contact with the photosensitive member 206 and is moved in the direction indicated by the arrow. It is so arranged that the photosensitive member 206 and the thermoreversible recording medium 203 will have substantially the same speed.

The photosensitive member 206 is charged uniformly by the corona charger 207, and thermal writing is conducted by the heat-emitting recording device 201 on the thermoreversible recording medium 203 in accordance with the image signal. An image represented by the different transmittance is formed on the thermoreversible recording medium 203.

The thermoreversible recording medium 203 on which the image has been formed is superimposed with the photosensitive member 206, and whole-surface exposure is conducted using the whole-surface exposure device 208 through the thermoreversible recording medium 203. Light in the amount corresponding to the image represented by the different transmittances of the thermoreversible recording medium 203 is passed through the thermoreversible recording medium 203 to other photosensitive member 206, and an electrostatic latent image is thereby formed. In the developing process, electric lines of force are created in the space between the developing roller 209 and the photosensitive member 206 due to the electrostatic latent image on the photosensitive member 206, and the charged toner 210 on the developing roller 209 is attached to the photosensitive member 206 by virtue of the electrostatic force. Development is thereby achieved.

In the transfer process, the recording medium 211 is fed, by a paper feed section not shown, and transported between the photosensitive member 206 and the corona charger 212 and is superimposed with the photosensitive member 206. The toner image on the photosensitive member 206 is thereby electrostatically transferred to the recording medium 211. In the fixing process, the toner image on the recording medium 211 is heated and melted by virtue of the heat from the heat-emitting roller 214. The molten toner 210 permeates between the fibers of the recording medium 211 and is fixed, owing to the pressure of the heating roller 214 and the pressure roller 215. The recording medium 211 on which the fixing has been completed is transported out of the housing of the apparatus.

The thermoreversible recording medium 203 having maintained the image consisting of the written portions and the non-written portions accompanied by the difference in transmittance is heated above $T_3$ by the whole-surface heat-emitting device 222 and is returned to the opaque state. Thus, the image on the thermoreversible recording medium 203 is erased, and the thermoreversible recording medium 203 can be used repeatedly.

Any residual toner on the photosensitive member 206 after the transfer process is removed by the cleaning means 226. A discharge lamp is also provided to remove any residual charges on the photosensitive member 206. The photosensitive member 206 is thereby used repeatedly.

When the thermoreversible recording medium 203 whose whole surface is in the opaque state is subjected to thermal writing in accordance with the image signal by means of the heat-emitting recording device 201, the written portions change to transparent state. With the prior-art thermoreversible recording medium 203, it was necessary to control heat-emitting recording device 201 so that the temperature is within 61° to 70° C. ($\Delta T = 9°$ C.). With the thermoreversible recording medium 203 used in the image forming apparatus according to the invention, the heat-emitting recording device 201 needs only to be controlled so that the temperature is within in 70° to 120° C. ($\Delta = 50°$ C.). So an inexpensive thermal head may be used as the heat-emitting recording device 201. In the embodiment under consideration, the heating temperature is set to be 100° C.±10° C. (90° to 110° C.). The thermoreversible recording medium 203 is rotated by the first free roller 223 and the second free roller 224, and irradiated with the light from the whole-surface exposure device 208. The image is thereby transferred to the photosensitive member, not shown, which is in contact with the thermoreversible recording medium 203. The processes that follow are identical to those in the conventional image forming apparatus.

The thermoreversible recording medium 203 having passed the transfer process is rotated further. When the transfer is made to more than one recording medium, it is kept rotated without change.

When new signals are to be written on the thermoreversible recording medium 203, the image signal is erased throughout the entire surface by heating the medium to $T_1$ to $T_2$ (60° to 70° C.). In this process, the whole-surface heat emitting device 222 needs to be controlled to emit heat at a constant temperature. But this can be achieved easily by use of a heater with a feedback control function. The thermoreversible recording medium 203 having its entire surface erased (to assume the opaque state) can be used for repeated thermal writing.

Embodiment D2

Figure 13:
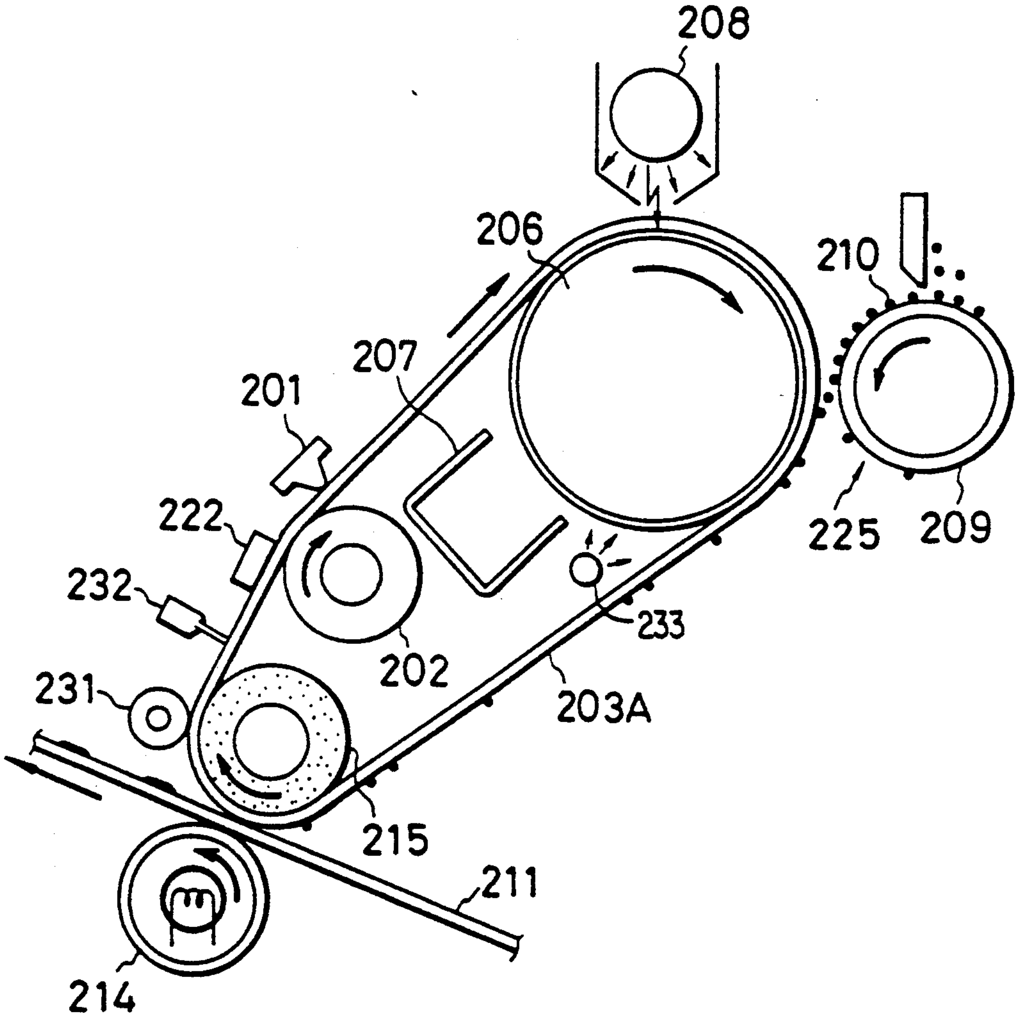
FIG. 13 is a schematic diagram showing an image forming device of a further embodiment of the invention.

FIG. 13 is a schematic diagram showing an image forming apparatus of a further embodiment, called Embodiment D2, of the invention.

In the FIG. 206 denotes a photosensitive member, 215 denotes a pressure roller, 214 denotes a heating roller, and 203A denotes a thermoreversible recording medium which is passed around the photosensitive member 206 and the pressure roller 215. 201 denotes a heat-emitting recording device, and 202 denotes a platen roller. These two members press the thermoreversible recording medium 203A between them.

207 denotes a corona charger as a charging means. It is disposed to face the surface of the photosensitive member 206. 208 denotes a whole-surface exposure device. It is disposed to face the thermoreversible recording medium 203A superimposed on the photosensitive member 206.

A developing means 225 attracts the toner on its developing roller 209, transports the toner, and conducts the development. It disposed to face the thermoreversible recording medium 203A superimposed on the photosensitive member 206.

The operation and the functions of the image forming apparatus will now be described.

The photosensitive member 206, the pressure roller 215, the heating roller 214 and the platen roller 202 are rotated, by a means not shown, in the direction indicated by the arrow, at a constant peripheral speed. The thermoreversible recording medium 203A is moved in the direction indicated by the arrow by frictional forces with the photosensitive member 206, the pressure roller 215, the heating roller 214 and the platen roller 202.

Thermal writing is conducted on the thermoreversible recording medium 203A by means of the heat-emitting recording device 201 in accordance with the image signal. An image represented by the different transmittances is formed on the thermoreversible recording medium 203A.

The photosensitive member 206 is charged uniformly by means of the corona charger 207. The thermoreversible recording medium 203A is superimposed with, being in contact with, the photosensitive member 206. Light is irradiated by means of the whole-surface exposure device 208 over the entire surface through the thermoreversible recording medium 203A. Light passes through the thermoreversible recording medium 203A in an amount corresponding to the image represented by the different transmittances, and is irradiated onto the photosensitive member 206.

In the development process, owing to the electrostatic latent image formed on the photosensitive member 206, electric lines of force are created in the space between the developing roller 209 and the thermoreversible recording medium 203A to penetrate the thermoreversible recording medium 203A, and the toner 210 on the developing roller 209 is attached to the thermoreversible recording medium 203A by virtue of the electrostatic force. Development is thereby achieved.

In the transfer and fixing process, the recording medium 211 is fed, by a paper feed means not shown, and transported between the pressure roller 215 and the heating roller 214. The recording medium 211 is superimposed with the thermoreversible recording medium 203A and the toner image on the thermoreversible recording medium 203A is melted by being heated by the heating roller 214. Because of the pressure, the molten toner 210 permeates the fibers of the recording paper 211 and is transferred and fixed.

The thermoreversible recording medium 203A which has retained the image consisting of the written portions and non-written portions accompanied by the differences in the transmittance is heated by the heating roller 214 above $T_3$ to assume the transparent parent state over its entire surface, but is thereafter heated by the whole-surface heating device 222 between $T_1$ to $T_2$ so that the entire surface becomes opaque.

A small amount of toner 210 may remain on the thermoreversible recording medium 203A after the transfer to the recording medium 211. But by pressure-contacting the fixing cleaner 231 on the pressure roller 215, it can be easily wiped off. The thermoreversible recording medium 203A may be electrostatically charged, but this can be removed by the discharge brush 232 disposed to be in contact with the thermoreversible recording medium 203A. The thermoreversible recording medium 203A is thereby used repeatedly with the erasure of the image, the cleaning and discharging being conducted.

After the developing process, the photosensitive member 206 is separated from the thermoreversible recording medium 203A, and any residual charges thereon are removed by the discharge lamp 233, and the photosensitive member 206 is used repeatedly.

The thermoreversible recording medium 203A is heated by the heating roller 214 at the transfer and fixing process, and reaches about 160° C. Its base material should therefore have heat-resistance. It is therefore formed of a film of polyester, polyimide, polyetherimide, polyethersulfone, polyether ether ketone or the like. Considering the electric lines of force created between the developing roller 209 and itself, the thermoreversible recording medium 203A should be not more than 200 $\mu m$ thick and considering the tensile strength and the ease of handling, the thermoreversible recording medium 203A should be not less than 10 $\mu m$ thick.

Embodiments D1 and D2 may be modified in various ways. For instance, in the above embodiments, the toner 210 was a heat-fixing toner, but when a microcapsule toner formed to be fixed upon application of minute pressure is used, a fixing device using pressure may also be used.

As has been described, according to Embodiments D1 and D2, the following effects are attained:

(1) Inexpensive thermal head or other heat-emitting recording device on which accurate control on temperature are not required can be used, and the image forming apparatus can be formed at a low cost.

(2) Special paper is not needed, and recording on ordinary paper is possible. Recording of identical pattern can be easily repeated a plurality of times.

(3) Development is repeatedly made on a thermoreversible recording medium using toner, so transfer rate is high, and any residual toner after the transfer may be wiped off easily. Cleaning devices which are required in ordinary electrophotography apparatus are therefore not needed.

(4) In the case of a process in which transfer and fixing are conducted simultaneously, the transfer is not made electrostatically, so a conductive toner which can be developed easily can be used.

(5) In the case of a process where transfer and fixing are not conducted simultaneously, the information on the thermoreversible recording medium is not erased at the time of fixing, so image formation on a plurality of recording media is possible.

What is claimed is:

1. An image forming apparatus comprising:

a means for charging a surface of a photosensitive member;

a means for thermally writing on a thermoreversible recording medium formed on a support member;

a means for exposing said photosensitive member when said thermoreversible recording medium is superimposed on said photosensitive member;

a means for developing a toner image on said photosensitive member;

a means for transferring said toner image onto a second recording medium, when said second recording medium is superimposed on said photosensitive member; and a means for fixing said toner image onto said second recording medium; wherein said thermoreversible recording medium is a mixture consisting essentially of a matrix material which consists essentially of a copolymer of styrene and butadiene, and a saturated carboxylic acid.

2. The apparatus of claim 1, wherein said saturated carboxylic acid comprises 10 to 24 carbon atoms, and is dispersed in said matrix material; and the weight ratio between the said matrix and said saturated carboxylic acid is from 1:1 to 20:1; and a solution of said mixture in an organic solvent is coated on said support member.

3. The apparatus of claim 1, additionally comprising:

a means for erasing an image on said thermoreversible recording medium.

4. The apparatus of claim 3, wherein said means for erasing is a means for localized erasure.

5. The apparatus of claim 3, wherein said means for erasing is a means for whole-surface erasure.

6. The apparatus of claim 1, wherein said means for exposing said photosensitive member exposes the entire surface of said member.

7. The apparatus of claim 1, wherein said saturated carboxylic acid comprises from 10 to 24 carbon atoms.

8. The apparatus of claim 1, wherein the ratio of said matrix material to said saturated carboxylic acid is 1:1 to 20:1.

* * * * *